(12) United States Patent
Elie et al.

(10) Patent No.: US 8,218,135 B2
(45) Date of Patent: Jul. 10, 2012

(54) SYSTEM AND METHOD FOR STEREO PHOTOGRAPHY

(75) Inventors: Larry Dean Elie, Ypsilanti, MI (US);
Dieter Giese, Dearborn, MI (US); John Matthew Ginder, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 11/832,236

(22) Filed: Aug. 1, 2007

(65) Prior Publication Data
US 2009/0033910 A1 Feb. 5, 2009

(51) Int. Cl.
*G01B 11/26* (2006.01)

(52) U.S. Cl. .................. 356/141.1; 356/5.01; 356/139.1

(58) Field of Classification Search ........ 356/3.01–3.15, 356/4.01–4.1, 5.01–5.15, 6–22, 141.1–141.5, 356/139.01–139.1, 152.2; 396/89
See application file for complete search history.

(56) References Cited

U.S. PATENT DOCUMENTS

| | | | |
|---|---|---|---|
| 3,894,802 A | 7/1975 | Higgins | |
| 4,705,401 A | 11/1987 | Addleman et al. | |
| 4,846,576 A | 7/1989 | Maruyama et al. | |
| 5,298,977 A * | 3/1994 | Shintani et al. | 356/603 |
| 5,910,845 A | 6/1999 | Brown | |
| 5,930,383 A | 7/1999 | Netzer | |
| 6,205,243 B1 | 3/2001 | Migdal et al. | |
| 6,538,751 B2 | 3/2003 | Ono | |
| 6,549,288 B1 | 4/2003 | Migdal et al. | |
| 2004/0196451 A1* | 10/2004 | Aoyama | 356/139.03 |
| 2005/0057744 A1* | 3/2005 | Pohle et al. | 356/139.03 |
| 2005/0200918 A1 | 9/2005 | Muller | |
| 2005/0213082 A1* | 9/2005 | DiBernardo et al. | 356/139.03 |
| 2005/0243330 A1* | 11/2005 | Magarill et al. | 356/610 |
| 2006/0092401 A1* | 5/2006 | Troxell et al. | 356/4.01 |
| 2006/0279745 A1* | 12/2006 | Wenstrand et al. | 356/614 |
| 2007/0030473 A1* | 2/2007 | Stanley | 356/3.01 |
| 2008/0231835 A1* | 9/2008 | Iizuka | 356/72 |

FOREIGN PATENT DOCUMENTS

JP 2002062111 A 2/2002

OTHER PUBLICATIONS

Chinese Office Action for corresponding Chinese Application No. 200810128108.3, mailed Sep. 25, 2009, 17 pages.
Shab Levy, "How to Make Lenticular Prints", http://www.gravitram.com/how_to_make_lenticular_prints.htm, Jul. 27, 2007, 12 pages.

(Continued)

*Primary Examiner* — Luke Ratcliffe
(74) *Attorney, Agent, or Firm* — Brooks Kushman P.C.

(57) ABSTRACT

A system and method for stereo photography is provided. The system comprises a first light source, a second light source and a photodetector. The first light source is configured to illuminate one or more first non-white colors on an object. The second light source is configured to illuminate one or more second non-white colors that are different from the first non-white colors on the object. The photodetector is configured to detect a three dimensional representation of the object at a single moment in time in response to the first light source illuminating the first non-white colors and the second light source illuminating the second non-white colors on the object.

13 Claims, 5 Drawing Sheets

OTHER PUBLICATIONS

RSI 3D Systems & Software, "New Minolta 3D Image Capture Device Takes Imaging to the Next Dimension", http://www.rsi.gmbh.de/minolta3d_e.htm, 2000, 3 pages.

Gina Keating, "Dolby, Infitec form partnership to develop cheaper 3-D for cinemas", USA Today, http://www.usatoday.com/tech/news/2006-07-31-dolby-3-d_x.htm?csp=34, Jul. 31, 2006, 2 pages.

Jorke et al., "Infitec—New Stereoscopic Visualisation Tool by Wavelength Multiplex Imaging", Infitec GmbH, 7 pages.

"Stereoscopy", Wikipedia Encyclopedia, http://en.wikipedia.org/wiki/Stereo_photography, Apr. 16, 2007, 9 pages.

3D Cameras, http://www.3dcgi.com/cooltech/cameras/cameras.htm, Mar. 23, 2007, 3 pages.

AEI Best Engineered Vehicle 2007, Apr. 2007, 2 pages (pp. 94 & 97).

* cited by examiner

SYSTEM AND METHOD FOR STEREO PHOTOGRAPHY

BACKGROUND

1. Technical Field

One or more embodiments of the present invention generally relate to a system and method for photographing three-dimensional objects.

2. Background Art

Conventional three-dimensional (3-D) stereo imaging, model making and filming techniques use lenses and two or more detectors positioned at two or more locations. The detectors use one or more light sources to capture images of an object. Such images are generally synchronized in order to provide depth information of the object. Conventional lenticular imaging uses three or more detectors positioned at three or more different locations. Such conventional techniques may be both expensive and inconvenient in practice.

In addition, conventional 3-D stereo image detecting techniques may need multiple or sequential steps in order to photograph a 3-D object. Such sequential steps may include the use of superimposing an image on an already created image to produce a photograph of the 3-D image, or comparing a series of photographs that were already taken to assess errors between the photographs in order to produce the final 3-D photograph of the image.

Accordingly it would be desirable to provide a 3-D photograph of an object at a single moment in time. It would also be desirable to reduce the number of photodetectors used to capture 3-D objects to minimize the cost and the inconvenience associated with photographing 3-D images.

SUMMARY

In one non-limiting embodiment, a system for stereo photography is provided. The system comprises a first light source, a second light source and a photodetector. The first light source is configured to illuminate one or more first non-white colors on an object. The second light source is configured to illuminate one or more second non-white colors that are different from the first non-white colors on the object. The photodetector is configured to detect a three dimensional representation of the object at a single moment in time in response to the first light source illuminating the first non-white colors and the second light source illuminating the second non-white colors on the object.

In another non-limiting embodiment, a method for performing stereo photography is provided. The method comprises illuminating one or more first non-white colors on an object with a first light source. The method further comprises illuminating one or more second non-white colors on the object with a second light source, the second non-white colors are different from the first non-white colors. The method further comprises capturing a three dimensional representation of the object with a photodetector in real time in response to illuminating the first non-white colors and the second non-white colors on the object.

In another non-limiting embodiment, a method for performing stereo photography on a vehicle is provided. The method comprises illuminating one or more first non-white colors on an object approaching the vehicle. The method further comprises illuminating one or more second non-white colors that are different from the first non-white colors on the object. The method further comprises capturing a three dimensional representation of the object at a single moment in time in response to illuminating the first non-white colors and the second non-white colors on the object.

DETAILED DESCRIPTION OF THE PREFERRED EMBODIMENT(S)

Figure 1:
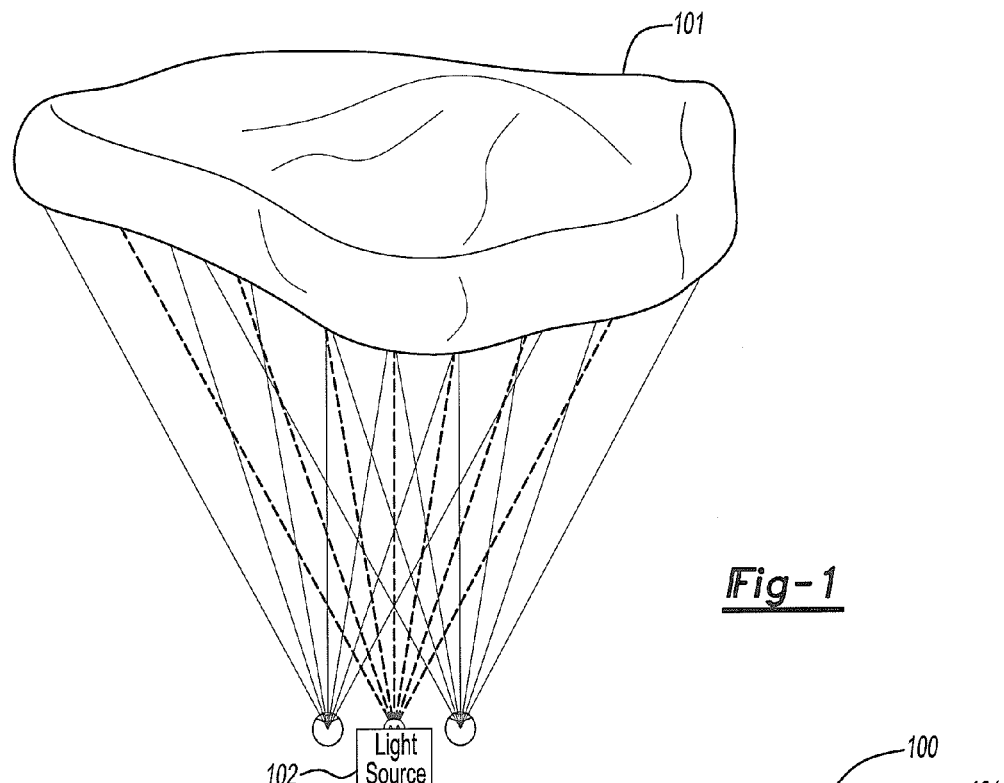
FIG. 1 illustrates the manner in which a human interprets three dimensional objects.

FIG. 1 illustrates the manner in which a human interprets a three dimensional (3-D) object 101. A light source 102 is adapted to illuminate white light on the 3-D object 101. In response to the light source 102 illuminating the white light on the 3-D object 101, the 3-D object 101 reflects rays of light that represent the colors and angle of the 3-D object 101 as differential angle information. A human interprets the differential angle information as depth information and is able to discern the 3-D object 101.

Figure 2:
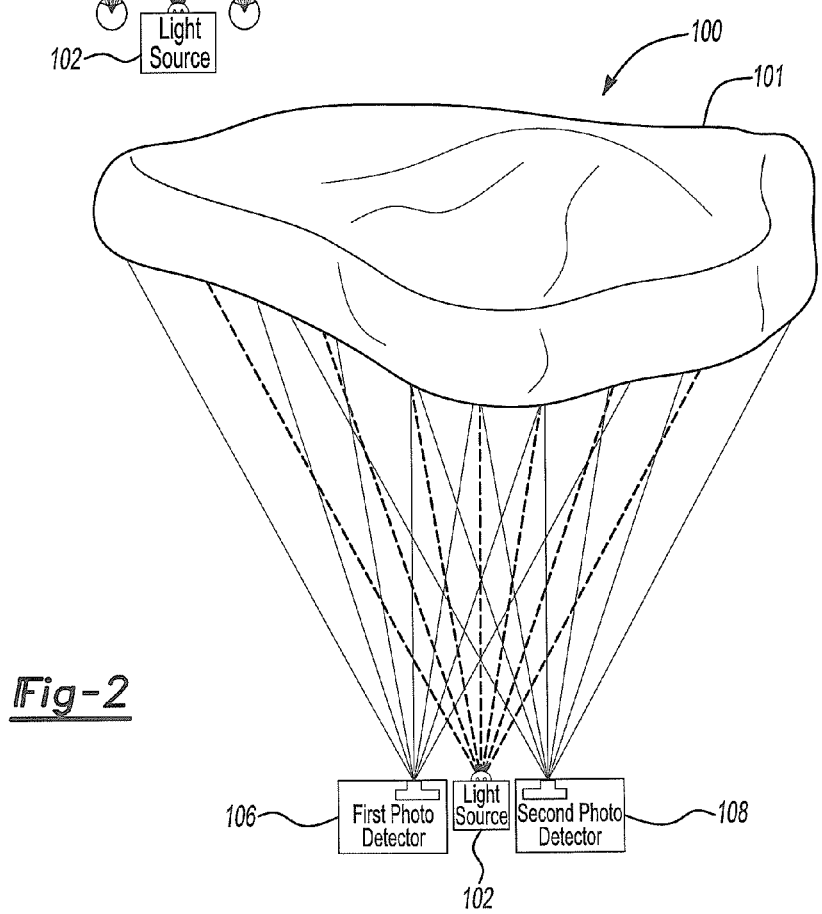
FIG. 2 illustrates a stereo photography system implemented with multiple photodetectors and a single light source.

FIG. 2 illustrates a stereo photography system 100. The stereo photography system 100 is adapted to produce one or more stereographic images. The stereo photography system 100 comprises the light source 102, a first photodetector 106 and a second photodetector 108. In a similar manner as indicated in FIG. 1, the light source 102 illuminates white light on the 3-D object 101. In response to the light source 102 illuminating the white light on the 3-D object 101, the 3-D object 101 reflects rays of light that represent the colors of the 3-D object 100 as differential angle information to the first and second photodetectors 106 and 108.

The first photodetector 106 records a view at a first location and the second photodetector 108 records a view at a second location. A distance between the first photodetector 106 and the second photodetector 108 may be defined as a stereo base. Such a distance between the photodetectors 106 and 108 may represent the distance between eyes of the human. By increasing the stereo base between the photodetectors 106 and 108, the photodetectors 106 and 108 may store an increased amount of angle information. Such an increase in the amount of angle information stored in the photodetectors 106 and 108 may increase the depth perception of the 3-D object 101. The photodetectors 106 and 108 use the angle information to produce a stereographic photograph of the 3-D object 101. As will be discussed in more detail in connection with FIG. 3, the stereographic photographs may be displayed or projected as anaglyphic images.

The angle information captured by the first photodetector 106 may later be represented by the color red. The angle information captured by the second photodetector 108 may later be represented by the color green. Such a coloration of the information stored in the photodetectors 106 and 108 may be used for producing the anaglyphic images.

Figure 3:
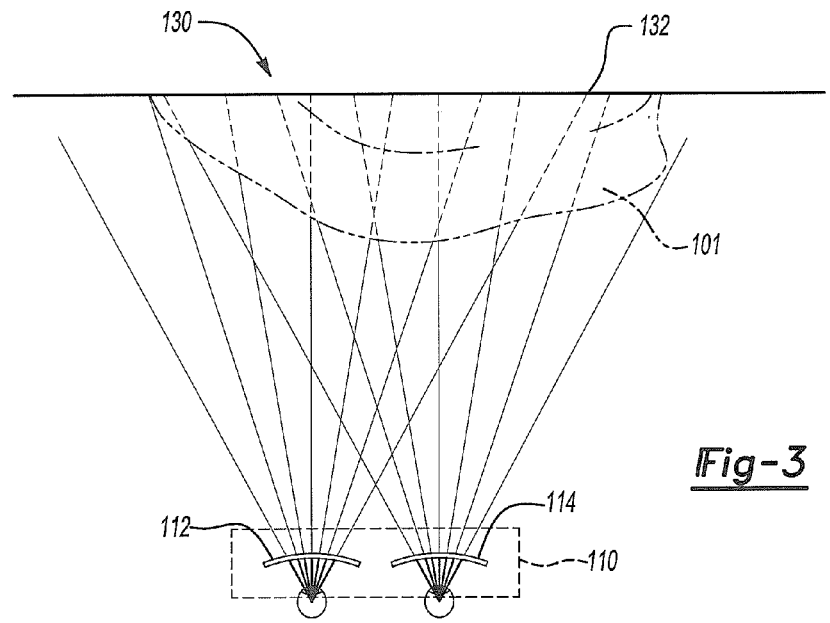
FIG. 3 illustrates a stereo graphic projection system.

FIG. 3 illustrates a stereo graphic projection system 150. The system 150 generally illustrates one example for projecting anaglyphic images of the object 101 as discussed in connection with FIG. 2. The system 150 generally comprises a projection screen 132. In one example, the projection screen 132 may be dark gray in color. A light source (not shown) may illuminate light on the projection screen 132 from the rear of the projection screen 132. Light emitted from the projection screen 132 may be received by a viewer having glasses 110.

The glasses 110 includes a first lens 112 and a second lens 114. The first and second lens 112, 114 may be colored differently from each other. In one example, the first lens 112 may be red and the second lens 114 may be green. The light illuminated on the projection screen 132 may be reflected as rays of red colors through the lens 112, and rays of green colors through the lens 114 into human eyes.

The anaglyph image placed on the projection screen 132 includes views captured from the first photodetector 106 and the second photodetector 108 as described in connection with FIG. 2. As noted in FIG. 2, a portion of the anaglyph image (displayed stereographic photograph) that was captured by the first photodetector 106 to produce the stereographic photograph may be colored red. The remaining portion of the anaglyph image (displayed stereographic photograph) that was captured by the second photodetector 108 may be colored green. The glasses 110 are configured to block colors that are not the same color as the lens 112, 114. A right eye may see the green colors (from the photodetector 108, via the second lens 114) and a left eye may see red colors (taken from the photodetector 106, via the first lens 112). Based on the differential angle information seen by the left and right eyes, the brain interprets the differential angle information as a phantom 3-D object (or virtual object of the 3-D object 101). Through the use of the glasses 110, the human sees the phantom 3-D object 101 in a manner similar to normal stereo vision.

Figure 4:
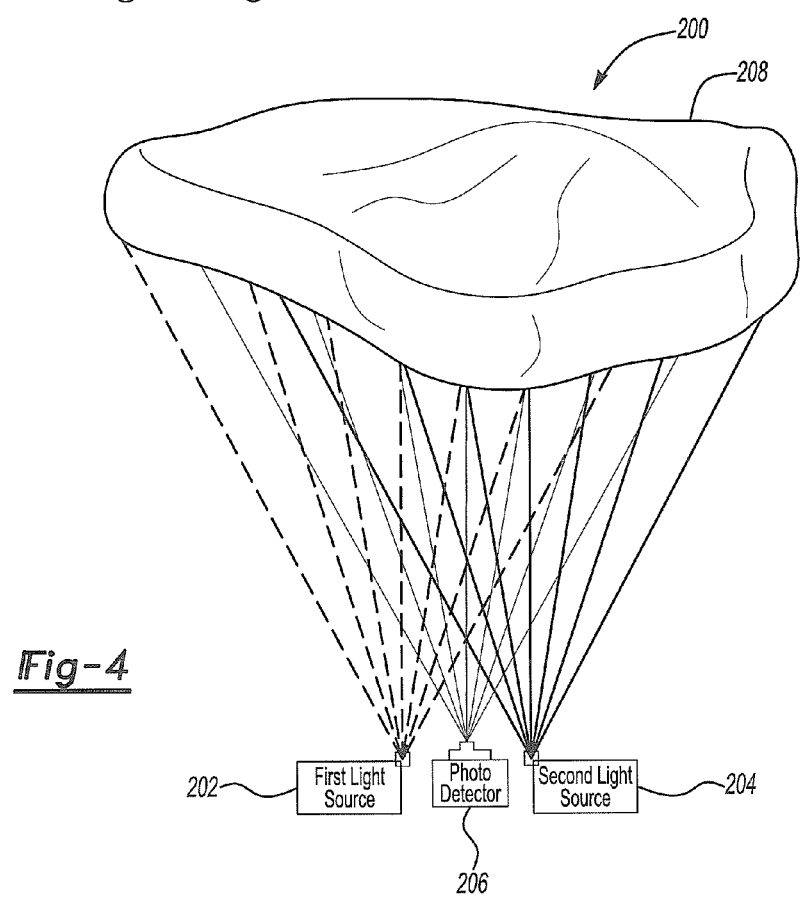
FIG. 4 illustrates a stereo photography system in accordance to one embodiment of the present invention.

FIG. 4 illustrates a stereo photography system 200 in accordance to one embodiment of the present invention. The system 200 comprises a first light source 202, a second light source 204 and a photodetector 206. In one example, the first and second light sources 202 and 204 may be implemented as monochromatic light sources. The first and second light sources 202 and 204 may comprise one or more of a light emitted device (LED), a filtered incandescent light (e.g., filtered out white color), and a laser.

The light sources 202 and 204 may illuminate non-white colors on a 3-D object 208. The light sources 202 and 204 are configured to illuminate different frequencies (or colors) from each other on the 3-D object 208. In one example, the first light source 202 may illuminate a red color on the 3-D object 208 and the second light source 204 may illuminate a green color on the 3-D object 208. Other examples may include the first light source 202 illuminating green and the second light source illuminating blue or any other non-green or non-white color. The types of colors illuminated on the 3-D object 208 may be varied to meet the design criteria of a particular implementation. The light sources 202 and 204 may illuminate infra red (IR) or ultra violet non-white on the 3-D object 208. The illumination of IR or UV non-white colors on the object are generally not visible by the human eye. Such a feature may be particularly useful for night vision systems and occupant detection systems in a vehicle. Other implementations may include the first and second light sources 202 and 204 illuminating visible non-white colors on an object.

In response to the first light source 202 illuminating the red light on the 3-D object 208 and the second light source 204 illuminating the green light on the 3-D object 208, the 3-D object 208 reflects rays of green and red lights that represent the image of the 3-D object 100 as differential angle information to the photodetector 206. The photodetector 206 captures the reflected rays of green and red colors and calculates the differential angle information to produce a stereographic photographic image of the 3-D object 208.

The first and second light sources 202, 204 may be separated by a predetermined distance from each other. The predetermined distance may be established based on the distance between the photodetector 206 and the 3-D object 208. To photograph the 3-D object 208 from a greater distance, the distance between the first and second light sources 202, 204 may be increased. While FIG. 3 illustrates that the first and second light sources 202 and 204 are positioned in a straight line across from each other, the first and second light sources 202 and 204 may be positioned in any orientation with respect to each other. The photodetector 206 may be positioned centrally between the first and second light sources 202 and 204.

The photodetector 206 is adapted to photograph an image of the 3-D object 208 in a single moment of time (or in real time). Such a system 200 may avoid the need to take sequential photographs in order to capture 3-D information of the 3-D object 208, or the need to superimpose or project pre-existing images to capture 3-D information of the 3-D object 208. By capturing an image of the 3-D object in a single moment of time, the system 200 may be implemented for any application in which it is necessary to detect motion on a real time basis. For example, and as will be discussed in more detail in connection with FIGS. 5-7, the system 200 may be implemented with a vehicle collision avoidance system, a vehicle adaptive cruise control system, a vehicle night vision system, and a computer modeling system. By capturing an image of the 3-D object in real time, the system 200 may be implemented for any application in which motion may need to be detected.

Each of the red and green lights reflected off of the 3-D object 208 may provide signature information (by way of the differential angle information). The photodetector 206 may use the signature information to determine the angle the light (e.g., red or green) reflected off of the 3-D object 208 in order to reconstruct a 3-D image of the 3-D object 208.

The types of colors emitted by the first and second light sources 202 and 204 may be combined to yield the illusion of white light. For example, the first light source 202 may combine lights at 440 nm, 535 nm and 640 nm wavelengths to create the illusion of white light on one side of the photodetector 206. The second light source 202 may combine lights at 460 nm, 555 nm and 660 nm wavelengths to create the illusion of white light one the other side of the photodetector 206.

The stereo graphic projection system 150 as described in connection with FIG. 3 may be used to project photographed 3-D images captured by the photodetector 206. In terms of still 3-D images captured by the photodetector 206, a viewer may need colored glasses to discern the 3-D image information. A viewer may not need colored glasses to view a 2-D representation of the captured object 208.

The system 200 may also be adapted for use in lenticular or barrier photography. In general, conventional lenticular photography requires the use of multiple photographs to be taken by a photodetector. In order to produce a particular print for use in a particular lenticular display, conventional lenticular photography techniques may employ taking any number of photographs of an object at different locations. For example, a conventional photography technique may position a camera (or photodetector) on a rail proximate to an object. The technique may further include capturing multiple images of the object as the camera slides on the rail.

The system 200 may capture an image of an object for lenticular photography by taking a single photograph in a single moment in time if two or more light sources 202, 204 are used that illuminate non-white colors on the object. Instead of capturing multiple images of the object as noted in connection with conventional lenticular photography, the non-white lighting reflected off of the object projects signature information by way of the differential angle information that is used by the photodetector 206 to determine the angle of the non-white lighting projected off of the object 208. For lenticular photography, the system 200 may need two or more independent light sources that illuminate non-white lighting.

For exemplary purposes, in the conventional photography technique as stated above, the camera may take 15 different shots of the object as the camera slides on the rail to produce a lenticular photograph. In contrast, the system 200 may capture an image of the object with a single shot in a single moment of time using 15 independent light sources that each project non-white lighting to produce a lenticular photograph of similar quality as that mentioned in connection with the conventional photography technique. In general, a viewer may not need 3-D glasses to view lenticular or barrier prints that are captured as noted in connection with the system 200.

Figure 5:
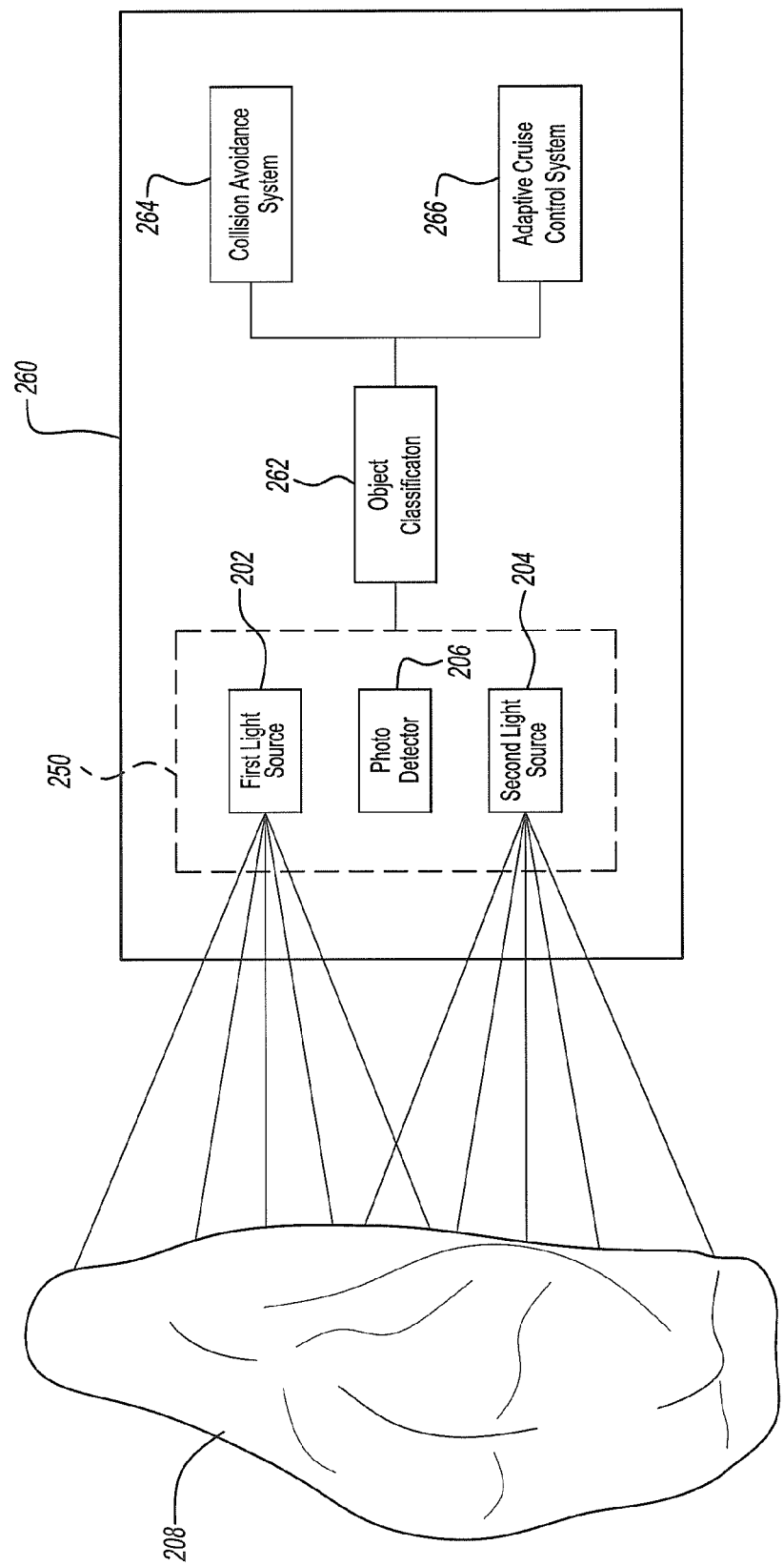
FIG. 5 illustrates the stereo photography system implemented in a vehicle in accordance to one embodiment of the present invention.

FIG. 5 illustrates a stereo photography system 250 in accordance to another embodiment of the present invention. The stereo photography system 250 may be implemented in a vehicle 260. The stereo photography system 250 generally comprises the first light source 202, the second light source 204, and the photodetector 206. The stereo photography system 250 may be implemented in the vehicle 260 to capture enhanced images of the 3-D object 208 for the purposes of collision avoidance, adaptive cruise control and night vision. The vehicle 260 includes an object classification system 262 adapted to classify on-coming objects approaching the vehicle 260.

A radar (not shown) and a lidar (not shown) may provide information related the on-coming object 208 to the vehicle 260. The stereo photography system 250 may capture an image of the on-coming object 208 and present such data to the object classification system 262. In one example, the light sources 202 and 204 may illuminate non-white color lighting on the object 208. The non-white lighting may be IR or UV which is generally not visible to the human eye. It is not desirable to illuminate non-white colors that are visible to humans from out of a vehicle since such visible rays may impede the vision of on-coming drivers. The object 208 may reflect non-white lighting as the signature information back to the photodetector 206. The photodetector 206 stores the signature information and calculates the differential angle information to capture (or photograph) the image of the object 208.

The object classification system 262 may use information from the radar, lidar and the stereo photography system 250 to determine the makeup of the object 208. The object classification system 262 may determine the makeup of the object 208 and the portion of the object 208 that is expected to impact the vehicle 260.

The object classification system 262 may present object information to a collision avoidance system 264. The collision avoidance system 264 may use the object information to direct the vehicle 260 away from the object 208. The object classification system 262 may present the object information to an adaptive cruise control system 266. The adaptive cruise control system 266 may adjust the speed of the vehicle 260 based on the object information presented from the object classification system 262.

The 3-D images provided by the stereo photography system 250 may assist the object classification system 262 in determining the make up of the object 208 at an earlier point in time. Such an early detection of the make up of the object 208 may also allow the collision avoidance system 264 and the adaptive cruise control system 266 to provide for a quicker response time.

A night vision system 268 may use the object information to discern a 3-D object 208 at night. In such a system, the first and second light sources 202 and 204 may illuminate the object 208 with pulsed IR non-white rays that are different from each other. By using a 2-pulse IR illumination at different frequencies, true depth perception of the object 208 may be obtained.

Figure 6:
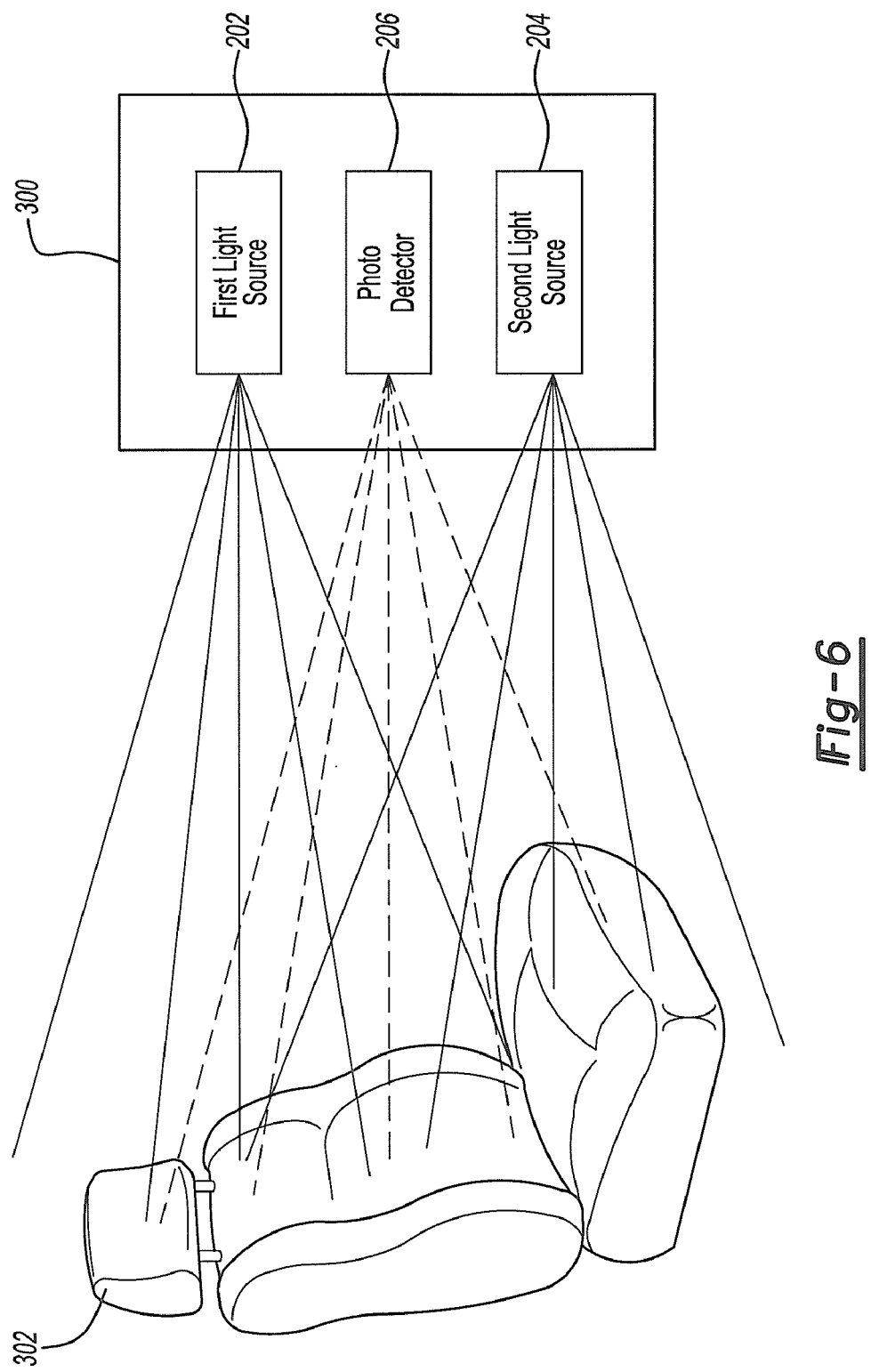
FIG. 6 illustrates the stereo photography system implemented as component modeling system in accordance to one embodiment of the present invention.

FIG. 6 illustrates a stereo photography system 300 adapted to perform computer modeling of a 3-D component in accordance to another embodiment of the present invention. The stereo photography system 300 generally comprises the first light source 202, the second light source 204, and the photodetector 206. The stereo photography system 300 may be adapted to model various components to determine if the physical dimensions of such components are within design criteria. In one example, the stereo photography system 300 may be used to photograph physical aspects of an automotive seat 302. While FIG. 6 illustrates the system 300 performing modeling on the seat 302, the stereo photography system 300 may be adapted to perform modeling on any physical part to assess whether the dimensioning of such parts are within design criteria.

In one example as to the operation of the stereo photography system 300, the light sources 202 and 204 may illuminate non-white color lighting on the automotive seat 302. The seat 302 may reflect non-white lighting as the signature information back to the photodetector 206. The photodetector 206 stores the signature information and calculates the differential angle information to capture 3-D images of the seat 302. The images of the seat 302 may be assessed to determine if the particular aspects of the seat design are within specified dimensions.

Figure 7:
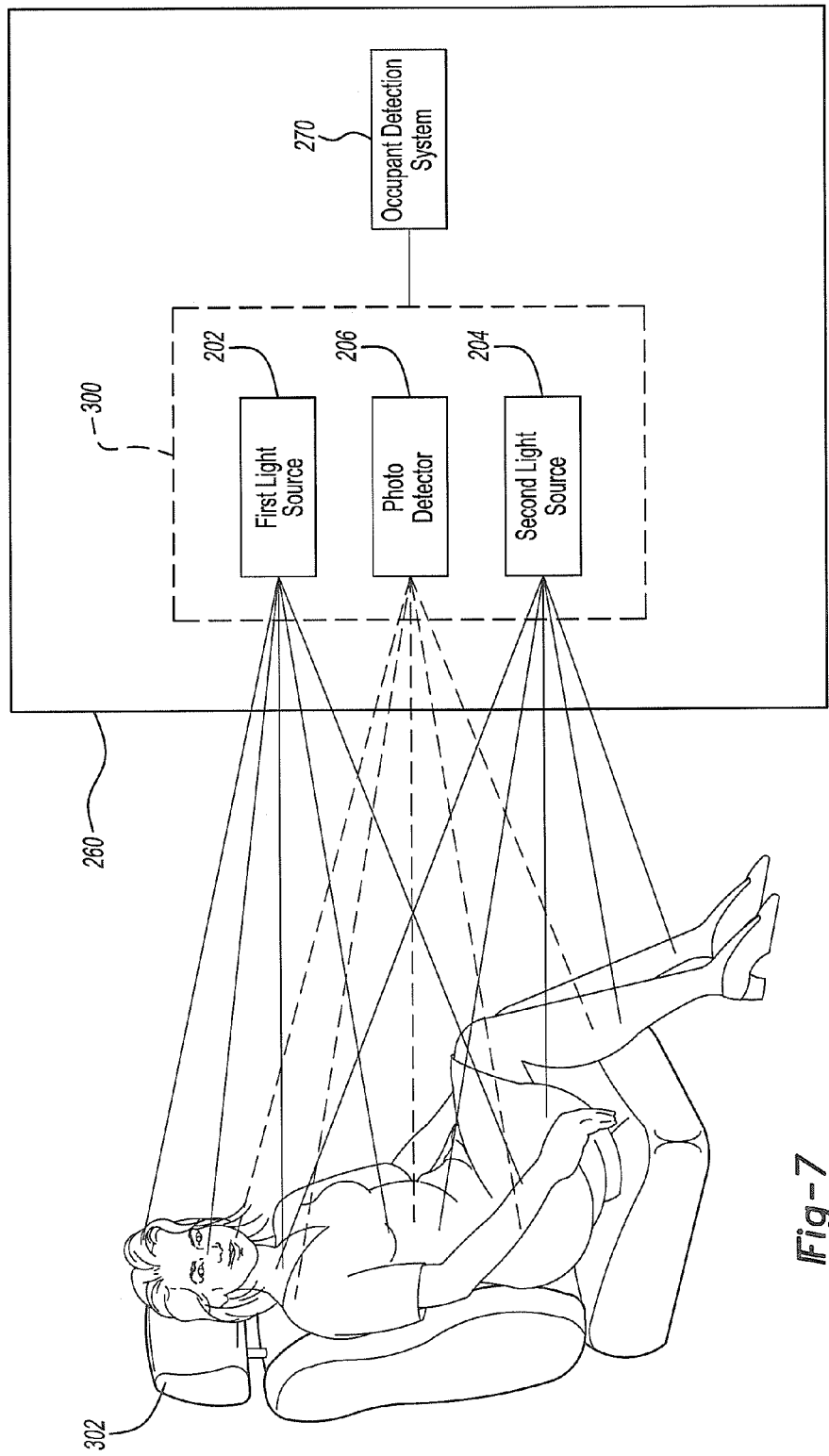
FIG. 7 illustrates the stereo photography system implemented as an occupant detecting system in the vehicle in accordance to one embodiment of the present invention.

FIG. 7 illustrates the stereo photography system 300 being implemented with an occupant detection system 270 in accordance to one embodiment of the present invention. The stereo photography system 300 may be adapted to detect the presence of an occupant in the seat 302 of the vehicle. In one example as to the operation of the stereo photography system 300 as used in connection with the occupant detection system 270, the light sources 202 and 204 may illuminate UV or IR non-white color lighting on the occupant in the seat 302. The use of UV or IR non-white color lighting may be used so that the occupant in the seat may not see the non-white color that is illuminated from the light sources 202 and 204.

The occupant in the seat 302 may reflect non-white lighting as signature information back to the photodetector 206. The photodetector 206 stores the signature information and calculates the differential angle information to detect or capture a 3-D image of the occupant in the seat 302. The photodetector 206 transmits 3-D image of the occupant in the seat 302 to the object detection system 270. The object detection system 270 assesses the object information that is transmitted from the photodetector 206 to determine whether an occupant is physically located in the seat 302. The occupant detection system 270 may use the object information from the photodetector 206 to determine the position of various occupants in the vehicle. Such detection may be used by a restraint controller to determine where to deploy an air bag and/or any other such restraints in the event the vehicle 260 encounters a collision. Such restraints may include various seatbelt restraints and/or pretensioners.

While the best mode for carrying out the invention has been described in detail, those familiar with the art to which this invention relates will recognize various alternative designs and embodiments for practicing the invention as defined by the following claims.

What is claimed is:

1. A stereo photography system for photographing an object, the system comprising:
    a first light source configured to illuminate one or more first non-white colors on the object;
    a second light source configured to illuminate one or more second non-white colors that are different from the first non-white colors on the object; and
    a photodetector configured to detect a three dimensional representation of the object by capturing a single image at a single moment in time in response to the first light source illuminating the first non-white colors on the object simultaneously with the second light source illuminating the second non-white colors on the object;
    wherein the first light source, the second light source, and the photodetector are disposed about a vehicle;
    wherein no more than the first light source and the second light source are provided in the system; and
    wherein the photodetector is further configured to detect the three dimensional representation of the object in relation to the vehicle by capturing the single image at the single moment in time for one of an adaptive cruise control system, a collision avoidance system, a night vision system, and an occupant sensing system.

2. The system of claim 1, wherein the photodetector is positioned between the first and second light sources.

3. The system of claim 2, wherein the photodetector is positioned centrally between the first and second light sources.

4. The system of claim 1, wherein the first and second light sources are adapted to simultaneously illuminate one or more invisible first non-white colors and one or more invisible second non-white colors, respectively.

5. A method for performing stereo photography; the method comprising:
    providing no more than two light sources about a vehicle;
    illuminating a first non-white color on an object with a first light source;
    illuminating a second non-white color on the object with a second light source simultaneously with the first non-white color being illuminated on the object, the second non-white color being different from the first non-white color; and
    detecting a three dimensional representation of the object with a photodetector, in relation to the vehicle at a single moment in time with a single image in response to simultaneously illuminating the first non-white color and the second non-white color on the object for one of an adaptive cruise control system, a collision avoidance system, a night vision system, and an occupant sensing system.

6. The method of claim 5 further comprising capturing the three dimensional representation of the object at the single moment in time with the single image to produce a lenticular or barrier photograph of the object in response to simultaneously illuminating the first non-white color and the second non-white color on the object.

7. The method of claim 5, further comprising positioning the first and second light sources a predetermined distance away from each other and positioning the photodetector centrally between the first and the second light sources.

8. A method for performing stereo photography in a vehicle, the method comprising:
    providing no more than a first invisible non-white color and a second invisible non-white color;
    illuminating a first invisible non-white color on an object approaching the vehicle;
    illuminating a second invisible non-white color that is different from the first invisible non-white color on the object at the same time the first invisible non-white color is illuminated on the object; and
    detecting a three dimensional representation of the object, with a photodector, in relation to the vehicle at a single moment in time by capturing a single image in response to illuminating the first invisible non-white color and the second invisible non-white color on the object at the same time for one of an adaptive cruise control system, a collision avoidance system, a night vision system, and an occupant sensing system.

9. The method of claim 8 further comprising capturing reflected first and second invisible non-white colors off of the object as angular information to detect the three dimensional representation of the object.

10. The system of claim 1 wherein the first light source and the second light source are configured to illuminate one or more first invisible non-white colors and one or more second invisible non-white colors, respectively, simultaneously on the object and wherein the photodetector is further configured to detect the three dimensional representation at the single moment in time in response to the first invisible non-white colors and the second invisible non-white colors being simultaneously illuminated on the object.

11. The system of claim 1, wherein the photodetector is configured to capture the one or more first non-white colors and the one or more second non-white colors off of the object as angular information at the same time to detect the three-dimensional representation of the object.

12. The method of claim 5 further comprising capturing the first non-white color and the second non-white color off of the object as angular information at the same time to detect the three dimensional representation of the object.

13. The method of claim 5, wherein the first non-white color is one of a visible non-white color and an invisible non-white color and wherein the second non-white color is one of a visible non-white color and an invisible non-white color.

* * * * *